June 23, 1931.   S. PAVLOFF   1,811,328
FRUIT GATHERER
Filed April 7, 1927   2 Sheets-Sheet 2
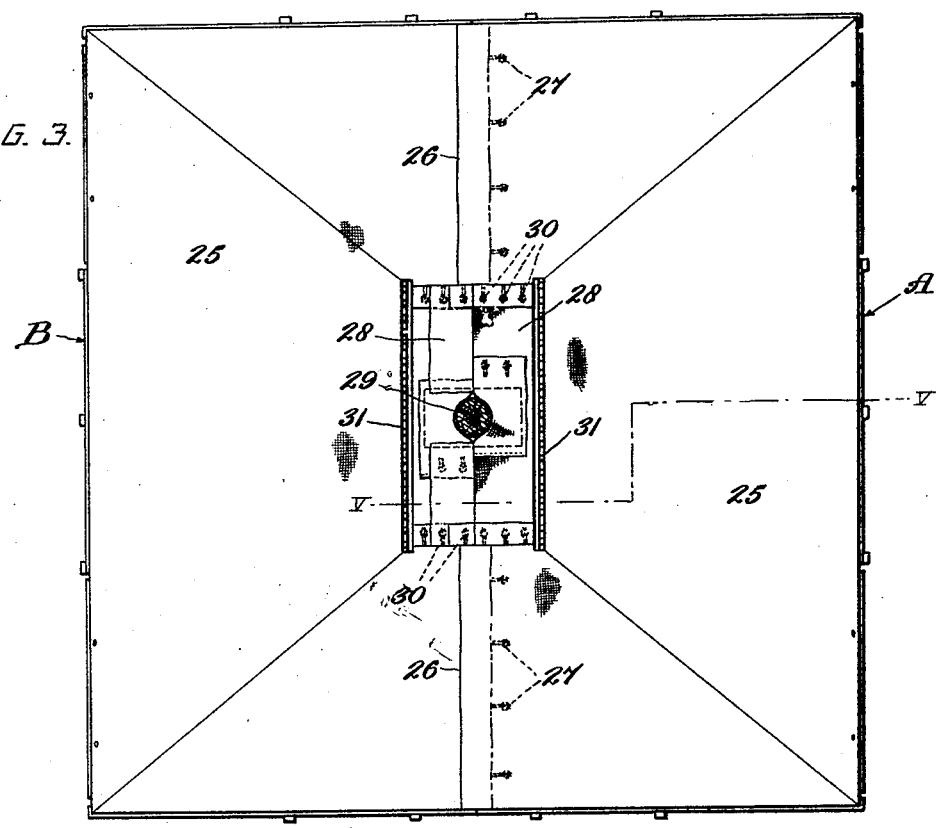
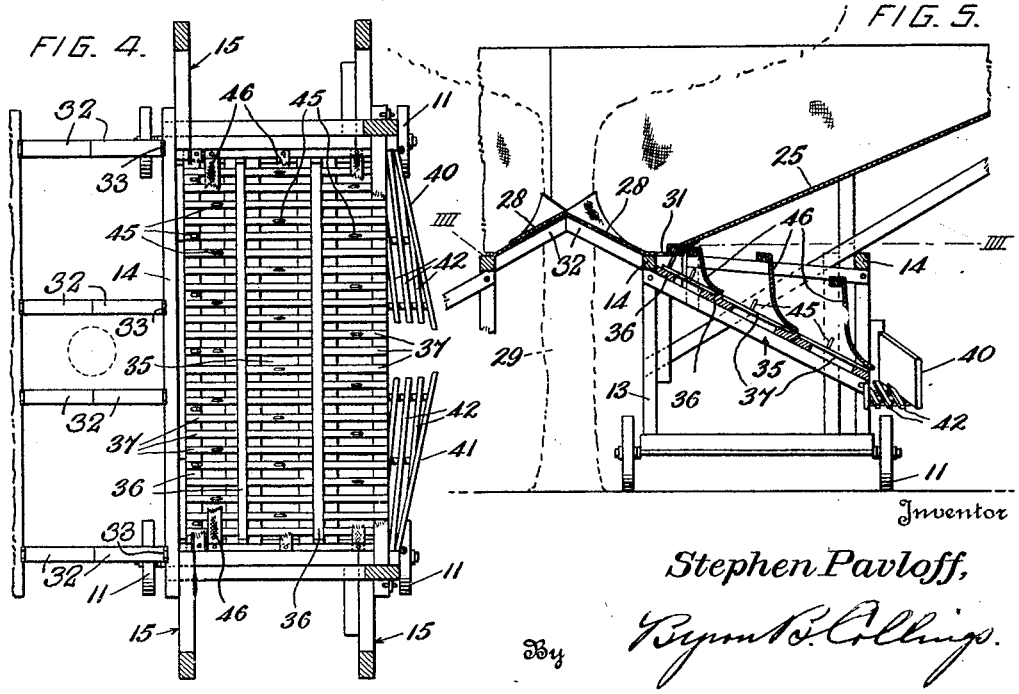
Inventor
Stephen Pavloff,
By Byron P. Collings
Attorney Patented June 23, 1931

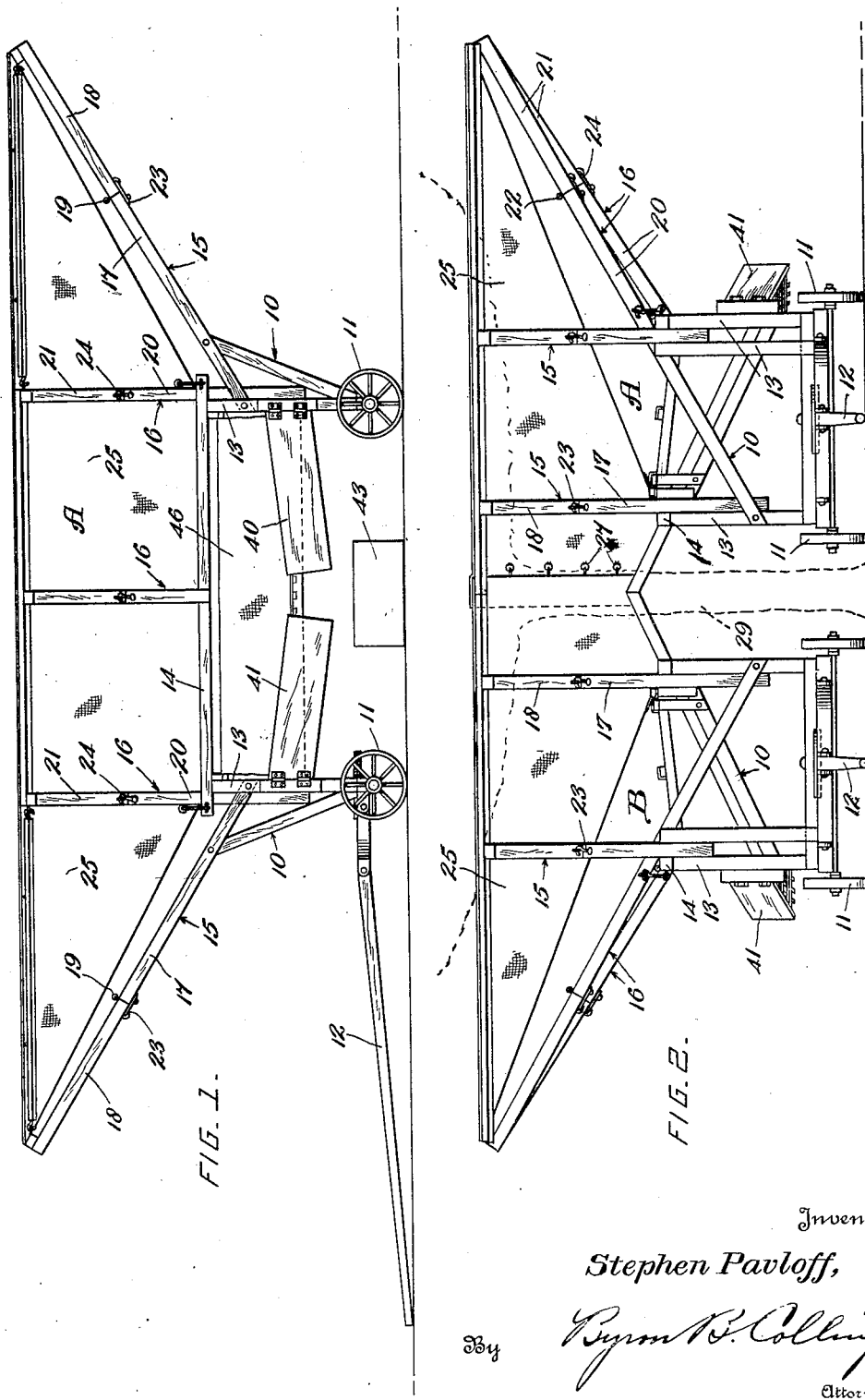

1,811,328

UNITED STATES PATENT OFFICE

STEPHEN PAVLOFF, OF CAMAS, WASHINGTON

FRUIT GATHERER

Application filed April 7, 1927. Serial No. 181,766.

This invention relates to fruit gatherers and graders and has for one of its objects to provide a device of this character which will be simple in construction, comparatively inexpensive to manufacture and more efficient in use than those which have been heretofore proposed.

A further object of the invention is to provide a fruit gatherer which may be positioned beneath a tree and receive fruit shaken or thrown therefrom which fruit after being segregated from such leaves and twigs as are unavoidably removed from the tree with it, will be automatically deposited in suitable receptacles, positioned beneath the gatherer.

A still further object of the invention is to provide an apparatus of the class described in which the operation of segregating the twigs, leaves and immature or imperfectly developed fruit may be carried on continuously.

With the above and other objects in view which will appear as the description proceeds, the invention consists in the novel details of construction and combinations and arrangements of parts more fully hereinafter disclosed and particularly pointed out in the appended claims.

Referring to the accompanying drawings forming a part of this specification in which like reference characters designate like parts in all the views:

Figure 1 is a side elevational view of the fruit gatherer and grader constructed in accordance with the present invention:

Fig. 2 is an end elevational view of the apparatus illustrated in Fig. 1, as viewed from the left of the said figure;

Fig. 3 is a top plan view of the parts shown in Figs. 1 and 2;

Fig. 4 is a detail sectional plan view of the grading and segregating portion taken approximately on the plane indicated by the line 4—4 of Fig. 5; and, Fig. 5 is a vertical cross sectional view taken approximately on the plane indicated by the line 5—5 of Fig. 3.

As will be more readily understood from an inspection of the drawings, the device comprises two complementary elements, A and B, which except for the fact that one is right handed and the other is left handed, are substantially duplicates of one another. In view of this duplication, the description will be confined principally to one of the elements, it being understood, however, that the other element contains substantially counter parts of the various features about to be set forth.

Taking the element A for example, it will be seen that it comprises a frame work 10 mounted upon wheels 11, whereby it may be readily transported from place to place and having a suitable tongue or other tractive device 12 whereby such moving may be accomplished. The said frame work comprises uprights 13 and horizontal members 14 to which are secured the inclined endwise extending arms 15 and the laterally extending arms 16. The arms 15 are shown as comprising two sections 17 and 18 hinged together as at 19 and in similar manner the arms 16 comprise two abutting sections 20 and 21 hinged together as at 22. Suitable catches 23 and 24 are provided upon the respective arms opposite the hinges 19 and 22 in order to prevent the unintentional breaking of the hinge joints when the device is in operation.

Secured to the arms 15 and 16 is a suitable fabric or other member 25, which in the extended or open positions of the arms is stretched to provide a yielding sloping surface adapted to be positioned beneath a tree for receiving the fruit after it is shaken or thrown therefrom. As will be readily understood from the drawings, when the two elements or sections A and B are properly positioned, one on each side of the tree, the fabric members 25 present an inverted truncated pyramid, it being understood that the meeting edges 26 of the said members 25 overlap, as is clearly shown in Fig. 3, and are secured together by suitable fastenings 27. Each of the elements A and B is provided with a small fabric member 28 near the bottom of the members 25, supported by transverse frame members 32, hinged as at 33 to the inner horizontal members 14, which members 28 are arranged to be secured around the trunk 29 of the tree and fastened in position by suitable securing means 30. These members 28, as will be clear from Fig. 5 are preferably inclined in an opposite direction to their companion members 25 and there is provided an aperture 31 between the adjacent edges of the members 28 and 25 through which the fruit may be discharged under the influence of gravity to the grading and segregating mechanism located below the fabric members and which will be more fully described below. It will be noted that the apertures 31, while long enough to extend completely across the width of the grading mechanism, are relatively narrow, from which it results that they are adapted to control the discharge of the fruit from the catching mechanism and to also, to some extent, distribute the fruit over the entire width of the grading device—that is to say, owing to their narrowness they will prevent the fruit from being fed to the grading device so rapidly that it will pile up thereon to such an extent that the grading operation will be imperfect and portions of the leaves, twigs and imperfect fruit be passed through the grading device without segregation.

The grading mechanism shown more particularly in Figs. 4 and 5, comprise a grate like structure 35 having longitudinally extending supporting members 36 and transversely extending spaced bars 37 supported upon said longitudinals. The spacing of the said bars 37 is dependent upon the particular fruit to be gathered and is preferably so selected that the apertures between the bars 37 will permit the immature and imperfectly developed fruit as well as the twigs and leaves to pass therethrough while preventing the perfectly developed fruit from doing so.

It will be noted that the grate like structure 35 is rigidly built into the frame work 10 and is inclined downwardly from the aperture 31 so that fruit deposited in the upper end of the said structure, through the aperture, will roll by gravity along the bars 37 to the lower edge of the grader. During this movement, of course, the immature fruit as well as the loose twigs and leaves will fall through the spaces between the bars while the perfect fruit will pass along the upper surfaces of the bars to the lower edge of the grader.

Positioned at this said lower edge, is a pair of chutes 40 and 41 which are also inclined as will be clearly understood from Figs. 1 and 5 and the bottoms of which are composed of spaced bars 42, as clearly shown in Figs. 4 and 5. These chutes are adapted to discharge fruit received from the lower edge of the grader structure 35 into a suitable receptacle or box 43 placed beneath the discharge ends of the said chutes, as will be clear from Fig. 1.

In order to facilitate the segregation of the twigs and leaves from the fruit, the bars 36 and 37 of the grader structure 35 are preferably provided with a plurality of upstanding pins or pegs 45 which serve to catch and deflect the leaves and twigs and assist in causing them to be passed through the openings beneath the bars while at the same time not materially retarding the passage of the perfect fruit to the chutes 40 and 41. This separation of the leaves and twigs is also furthered by the provision of depending fabric strips or flaps 46, the lower edges of which rest upon the grader bars but which owing to their flexibility will freely permit the fruit to roll beneath them although they will tend to remove any twigs and leaves adhering to the said fruit.

The manner of using the apparatus will be readily apparent to those skilled in the art it being understood that the two elements A and B are positioned one on either side of the tree, as shown in the drawings, with the arms 15 and 16 and the fabric members 25 carried thereby in their extended positions, whereupon the limbs of the tree may be shaken in any suitable manner to cause the ripe fruit to be loosened therefrom and fall on to the fabric members. Owing to the inclination of these members, the fruit together with a certain amount of leaves and twigs will roll under the influence of gravity to the apertures 31 through which they will drop onto the grader structure 35 where the twigs, leaves and immature fruit will drop through the spaces between the bars 37 while the perfect fruit will continue down to the chutes 40 and 41 and be deposited in receptacles 43 provided therefor.

Although the arms 15 and 16 have been described as hinged and foldable and the member 25 as being comprised of fabric whereby it may also be folded for facilitating moving of the apparatus and economizing in space in the storing of the same, it will be obvious that where such considerations are not important, the said arms may be made in one piece and if desired the fabric members 25 may be replaced by wood, metal or other rigid material.

While one form of the invention has been thus illustrated and described, it is obvious that those skilled in the art may vary the details of construction as well as the precise arrangements of parts without departing from the spirit of the invention and therefore it is not wished to be limited to the above disclosure except as may be required by the claims.

What is claimed is:

1. In a fruit gatherer of the class described, a pair of mobile units adapted to be positioned one on each side of a tree, each of said units comprising a frame having a plurality of arms upwardly and outwardly inclined from the tree, said arms each composed of a plurality of abutting members; hinge connection between said arm members; fabric members secured to said arms; and means for preventing the unintentional breaking of the hinge connections between said arm members.

2. In a fruit gatherer of the class described, a pair of mobile units adapted to be positioned one on each side of a tree, each of said units having a plurality of arms upwardly and outwardly inclined from the tree, each of said arms composed of a pair of members; hinge connections between each pair of members, whereby the outer member of each pair may be swung upwardly and inwardly to reduce the outside dimensions of the units for transportation; and fabric members secured to said arms.

In testimony whereof I affix my signature.

STEPHEN PAVLOFF.